UNITED STATES PATENT OFFICE.

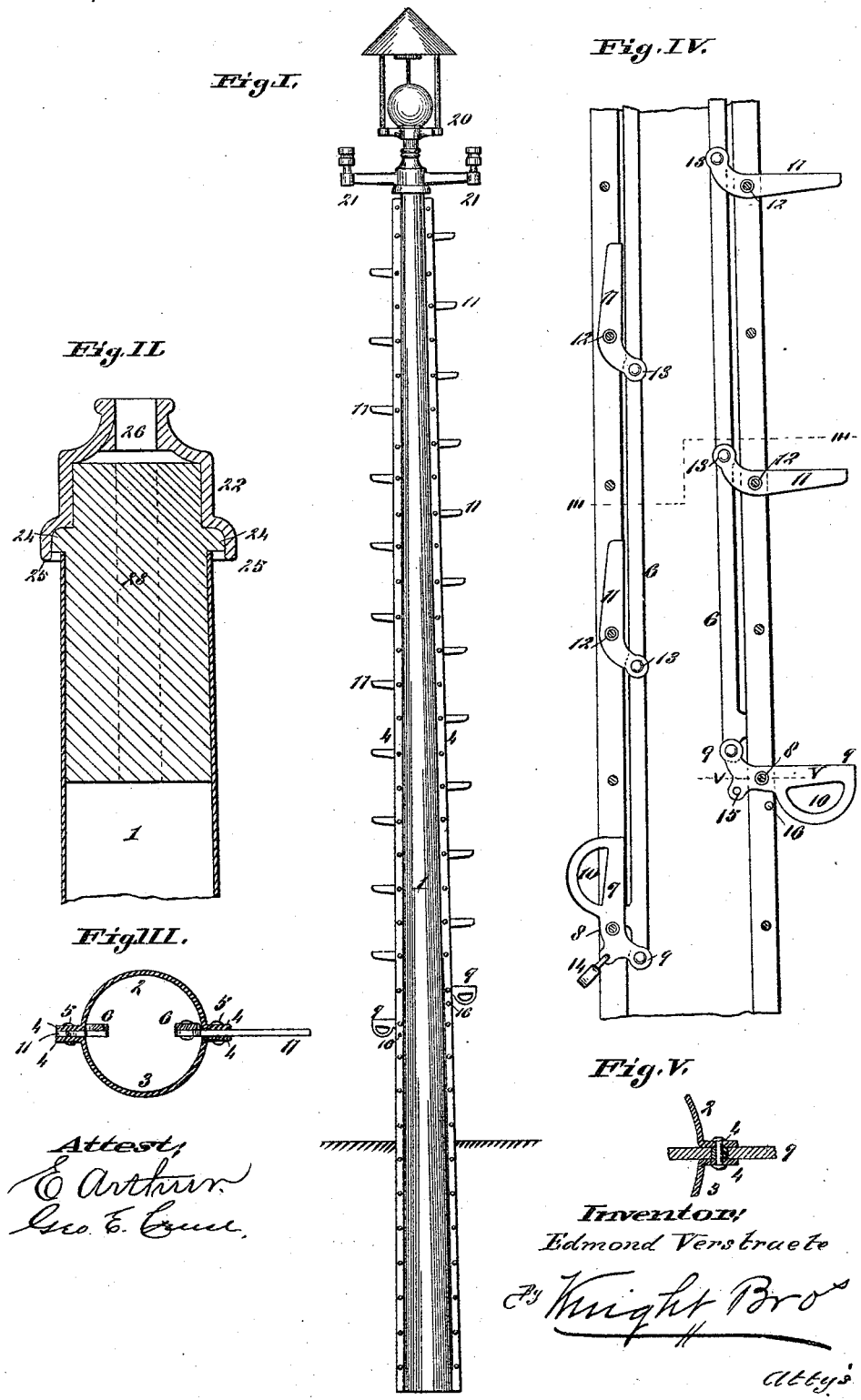

EDMOND VERSTRAETE, OF ST. LOUIS, MISSOURI, ASSIGNOR OF ONE-HALF TO PETER M. KLING AND GEORGE J. KOBUSH, OF SAME PLACE.

POLE FOR ELECTRIC WIRES, &c.

SPECIFICATION forming part of Letters Patent No. 438,036, dated October 7, 1890.

Application filed December 27, 1889. Serial No. 335,128. (No model.)

*To all whom it may concern:*

Be it known that I, EDMOND VERSTRAETE, of the city of St. Louis, in the State of Missouri, have invented a certain new and useful Improvement in Poles for Electric Wires, &c., of which the following is a full, clear, and exact description, reference being had to the accompanying drawings, forming part of this specification.

My invention relates to a ladder attachment for electric-light poles, &c.; and my invention consists in features of novelty, hereinafter fully described, and pointed out in the claims.

Figure I is a side elevation illustrative of my invention. Fig. II is an enlarged detail section showing the upper end of the post. Fig. III is a transverse section taken on line III III, Fig. IV. Fig. IV is a detail section showing part of the central portion of the post. Fig. V is a detail section taken on line V V, Fig. IV.

1 represents an iron pole divided vertically in two halves or members 2 3, provided with flanges 4, through which rivets 5 are passed to join the two members together. The pole is preferably metallic, and within are arranged two longitudinal bars 6, which are capable of being moved from the position shown on the left side of Fig. IV to the position shown on the right-hand side.

7 represents levers pivoted at 8 to the pole by rivets or bolts passing through the flanges 4, and to the inner ends of which the bars 6 are pivoted at 9. The levers 7 are provided with suitable hand-holds, consisting, preferably, of loops 10, by which they are grasped to move them and the bars 6 from the position shown on the left-hand side of Fig. IV to the position shown on the right-hand side, and vice versa.

11 represents steps pivoted to the post at 12 by rivets or bolts passing through the flanges 4, and pivoted to the bars 6 at 13. As these steps fit between the flanges of the two members of the post, these flanges will be held sufficiently far apart to permit the steps to be folded in between the flanges, as shown on the left-hand side of Fig. IV, and it will be seen that by raising the lever 7 from the position shown on the right-hand side of Fig. IV to the position shown on the left-hand side the steps will be moved into a position between the flanges out of sight and out of the way, and when in this position they may be there secured by a padlock 14, which is passed through a perforation 15 in the lever and through a perforation 16 in the flanges.

When it is desired to mount the pole, the steps are thrown out into using position or into the position shown in Fig. I and the right-hand side of Fig. IV by removing the padlocks 14 and pulling the levers 7 outwardly and downwardly, when the steps will be brought into a horizontal position ready for use.

20 represents a lamp located on the pole, and 21 arms for supporting the wire.

To avoid danger of the post and steps being charged with electricity, I secure the lamp and arms on a cap or neck 22, fitted onto a wood or non-conducting plug 23, which fits down into the upper end of the post 1. (See Fig. II.) The plug has a shoulder 24, fitting on the top of the post 1, and over which projects an outturned flange 25 on the cap or neck 22. It will thus be seen that there is no contact or electrical communication between the cap or neck and the metallic post. The lamp has a stem which is fitted in a socket 26 of the cap 22, and, if desired, this stem may extend down through the wooden plug 23, as shown by dotted lines, Fig. II.

I claim as my invention—

1. In combination with a pole, a folding ladder pivoted to the pole and adapted to be shifted to move the steps into using position or to fold them into non-using position, substantially as specified.

2. In a pole, the combination of bars arranged within the pole, pivoted levers to which the bars are connected, and steps pivoted to the pole and to the bars, whereby said steps can be folded into using or non-using position, substantially as and for the purpose set forth.

3. In a pole, the combination of the members 2 3, provided with flanges 4, levers 7, and steps 11, pivoted to said flanges, and bars 6, located within the pole and pivoted to said steps and levers, substantially as and for the purpose set forth.

4. In combination with a post, a ladder composed of bars 6, pivoted levers 7, connected to the bars, pivoted steps 11, connected to the bars, and a lock 14, substantially as set forth.

5. In combination with a pole, an insulating-plug 23, fitted into the upper end of the pole, a metallic cap 22, fitted on said plug and having flange 25 and perforation 26 through its top, arms 21, supported on said cap, and a lamp 20, supported in said perforation 26, substantially as and for the purpose set forth.

EDMOND VERSTRAETE.

In presence of—
M. M. KINGSLAND,
J. M. MAROT.